United States Patent Office 2,846,389
Patented Aug. 5, 1958

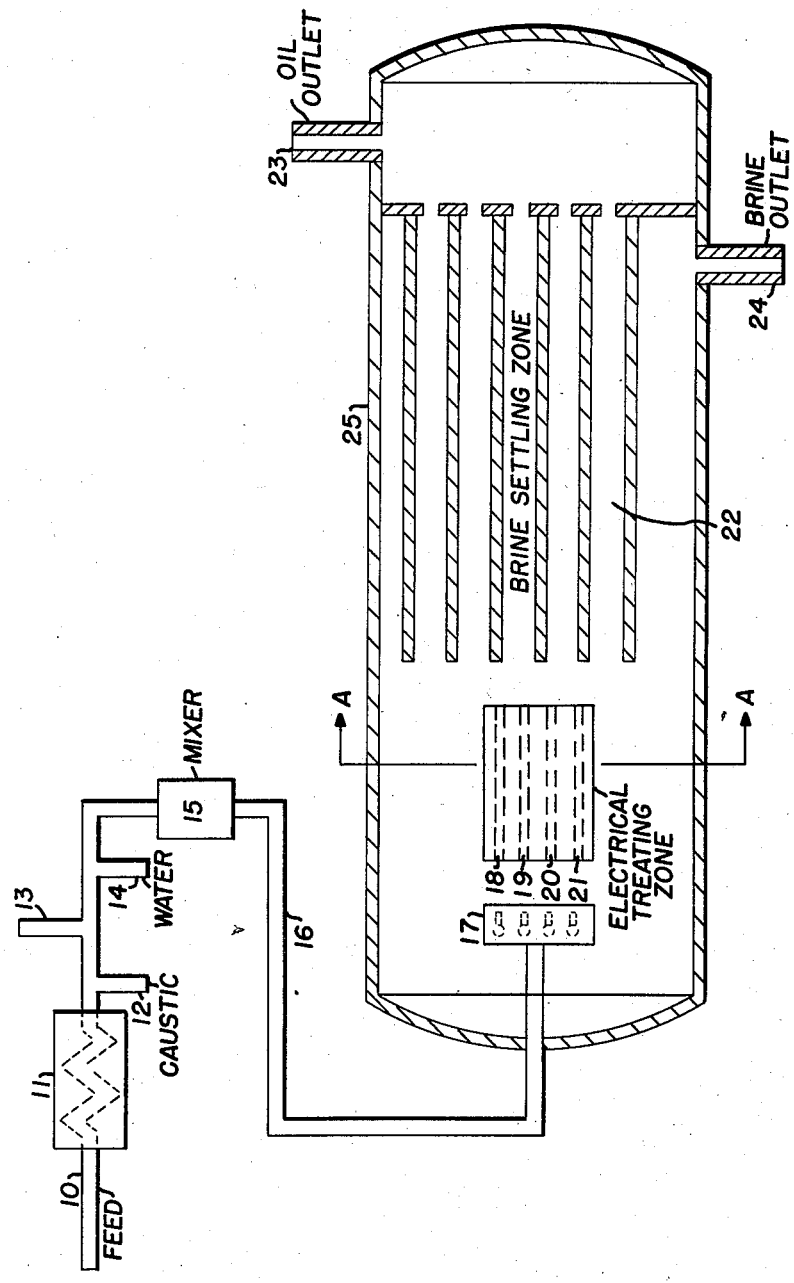
Mason L. Downing
Frank J. Herrmann    Inventors
Sam Gordon Marx
By W. N. Wright  Attorney

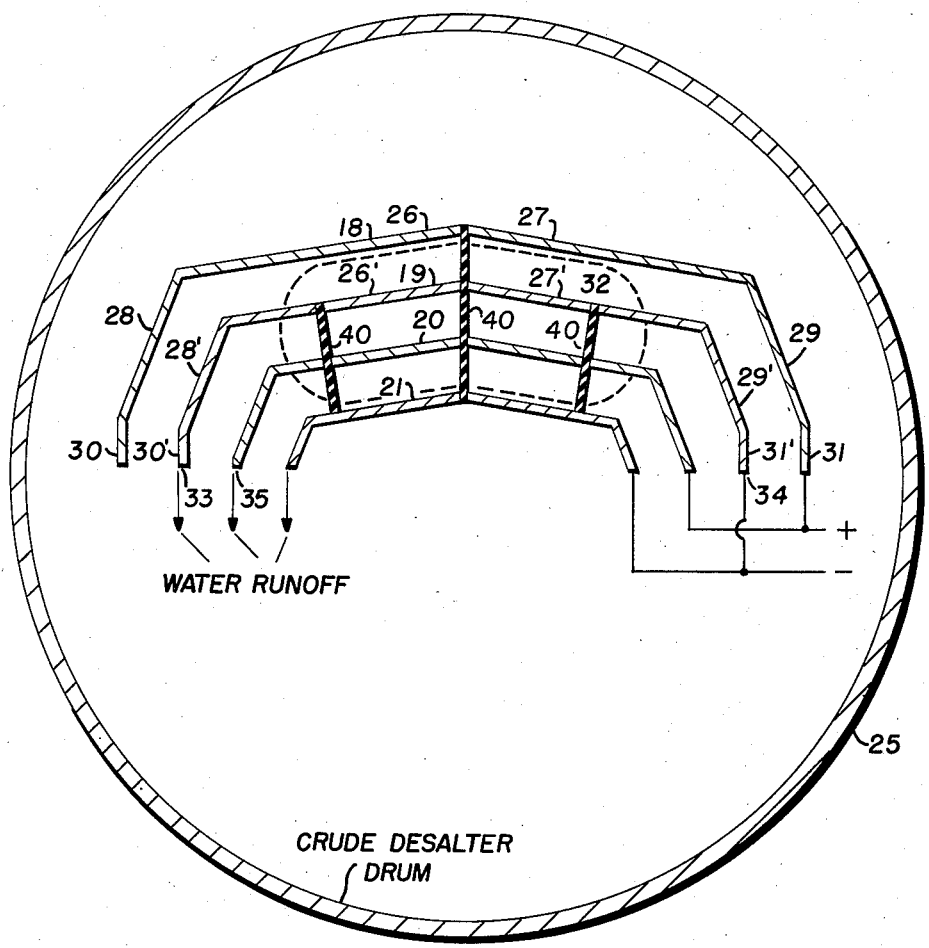
FIGURE-II
Mason L. Downing
Frank J. Herrmann      Inventors
Sam Gordon Marx Aug. 5, 1958 M. L. DOWNING ET AL 2,846,389
ELECTRODE FOR ELECTRICAL COALESCENCE
Filed June 9, 1954 4 Sheets-Sheet 3
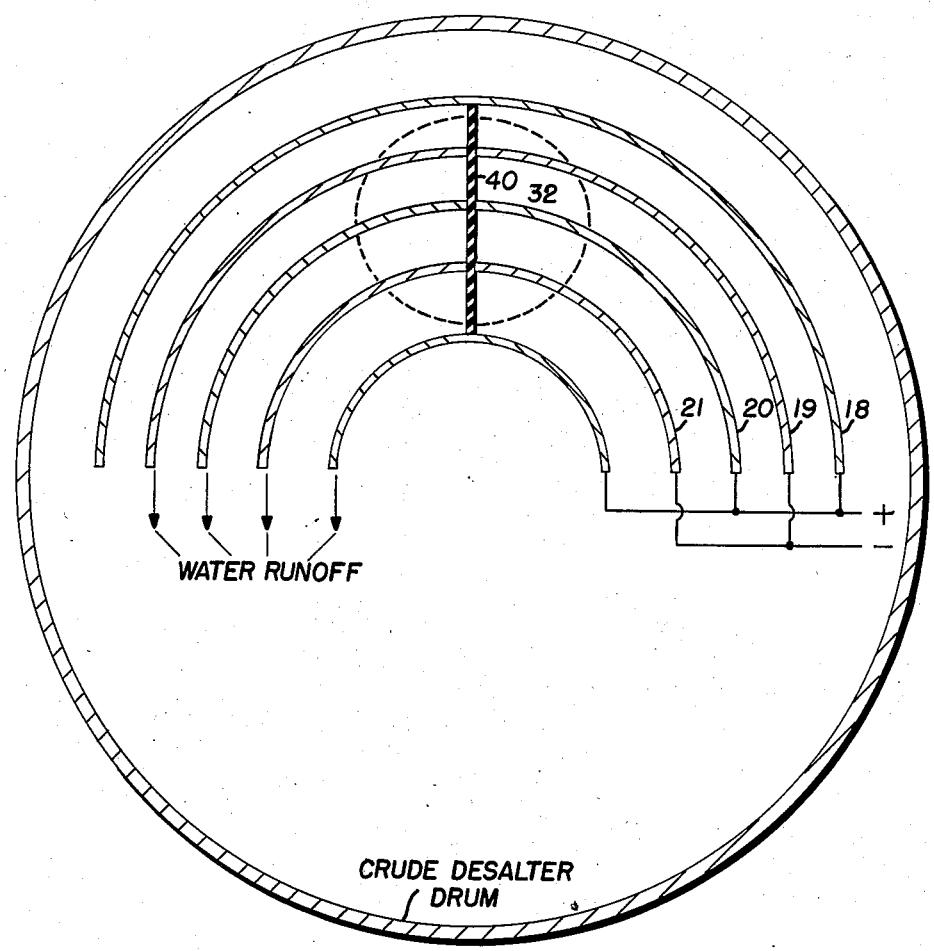
FIGURE-III
Mason L. Downing
Frank J. Herrmann    Inventors
Sam Gordon Marx
By W. N. Wright    Attorney Aug. 5, 1958  M. L. DOWNING ET AL  2,846,389
ELECTRODE FOR ELECTRICAL COALESCENCE
Filed June 9, 1954  4 Sheets-Sheet 4
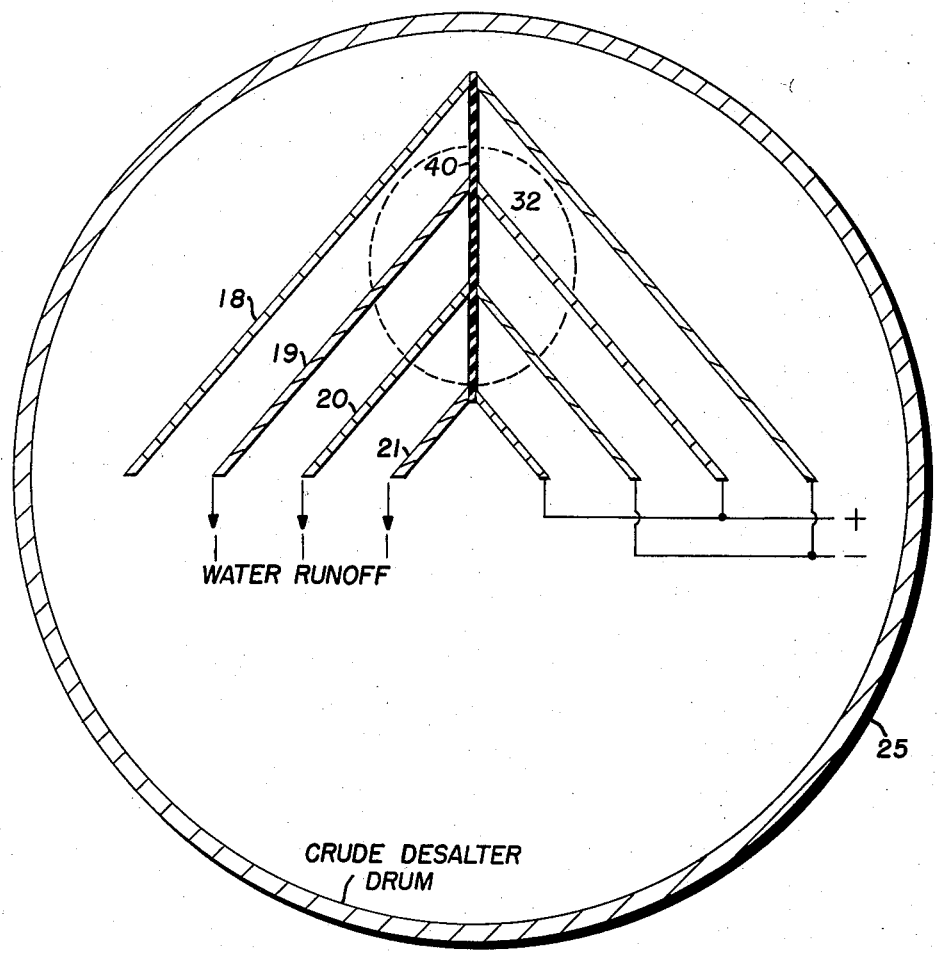
FIGURE-IV
Mason L. Downing
Frank J. Herrmann   Inventors
Sam Gordon Marx
By W. N. Wright   Attorney

2,846,389

ELECTRODE FOR ELECTRICAL COALESCENCE

Mason L. Downing, Westfield, Frank J. Herrmann, Elizabeth, and Sam Gordon Marx, Newark, N. J., assignors to Esso Research and Engineering Company, a corporation of Delaware Application June 9, 1954, Serial No. 435,506

9 Claims. (Cl. 204—302)

This invention relates to the removal of salt from liquid hydrocarbons, and more particularly to improved apparatus and process for effecting such a separation by employing electrical coalescence. More specifically, the invention concerns an improved electrode designed for use in electrical coalescing devices and a process involving the use of such electrodes.

In the past, it has been known to separate dissolved salt from crude oil by electrical coalescence involving the chemical treating and emulsifying of a hydrocarbon stream containing salt and passing such a treated emulsion through a zone in which it is subjected to the effect of an electrical field for coagulation. Such a process is covered by, for example, U. S. Patent No. 2,666,739 to John W. Packie. In coalescing equipment of the type normally used, a series of substantially parallel horizontal plates are used as electrodes and an emulsion of the crude salt-containing hydrocarbon and water is passed between the plates. During the passage through this zone the emulsion is partly broken by the potential difference existing between the plates causing the coalescence of a water solution of the salt, leaving the hydrocarbon relatively free of dissolved salt. Since these electrodes are normally parallel horizontal plates, the coalesced brine tends to collect on them and flow downwardly under the influence of gravity from one electrode to the electrode immediately beneath it. Since the brine solution is an electrolyte, this causes undesirable arcing of current between the two plates. In order to avoid this it has been suggested that the electrodes be recessed inwardly at the sides and end of the electrode zone, but such an expedient sacrifices effective area of the coalescing zone.

It is an object of the present invention, therefore, to provide an improved electrode design for electrical coalescers in which it is impossible for coalesced electrolyte to fall from one electrode to another.

It is a further object of this invention to provide improved electrode design for use in electrical coalescers in which there is no danger of arcing between electrodes.

It is a still further object of the present invention to provide an improved electrode design presenting a maximum area within which electrical coalescence due to potential difference may take place and whereby bypassing of such a coalescing area may be minimized.

It is a still further object to provide an improved process for the desalting of hydrocarbon mixtures in which undesirable arcing between coalescing electrodes does not occur.

These and other objects, which will be in part apparent and in part specifically pointed out in the subsequent description, are attained by providing apparatus for the removal of salt from a hydrocarbon mixture comprising a plurality of opposed, vertically spaced electrodes having side portions and defining surfaces which are inclined with respect to the horizontal, said side portions all terminating in the same horizontal plane, which is vertically below all points defining said surfaces. The emulsion of salt-containing oil and water to be coalesced flows between the electrodes, and as coalescence takes place, the salt-containing water, or brine, tends to flow downwardly under the influence of gravity across the surface of the electrodes to the edge portions thereof. Since these edge portions are all in the same horizontal plane, there is no tendency for the force of gravity to cause coalesced brine to flow from the edge of one plate to the edge of the adjacent plate, and the brine simply flows off the electrodes and settles in the bottom of the desalting drum.

It is well known in the art that various petroleum crudes contain salts and other deleterious substances in various concentrations. These salts comprise magnesium chloride, calcium chloride, and sodium chloride. Among other metals present are iron, strontium, potassium and vanadium. Their salts may be present as the bromides, the sulfates, the carbonates and the bicarbonates. It is necessary that these salts be removed from crudes, or at least reduced to a large extent, since the salts not only cause corrosion of the refining equipment, but also plug equipment, as for example, heat exchangers, condensers, and the like. While sodium chloride usually is present in the largest concentration, the magnesium chloride and the calcium chloride apparently cause the greatest amount of corrosion and damage of the refining and distillation equipment. It is thus known to remove these objectionable salts by various procedures.

One conventional method employed is to add water to the crude containing these salts and to heat the mixture to an elevated temperature, as for example, to about 250° F. to 350° F. The heated stream is maintained at an elevated pressure, as for example, of about 175 to 225 pounds per square inch. In a desalting operation of this character in order to secure excellent contact between the water and the salt in the crude, it is necessary to secure complete mixing of the water and the crude oil which results in the formation of an emulsion of the oil and water. The mixing may be secured by any means but is usually accomplished by passing the stream through a pressure reducing valve. The resulting emulsion is usually passed through a bed of coagulation material which generally comprises sand or excelsior. The stream is then passed to a settling zone wherein the water and oil segregate. The water phase containing the salt is withdrawn from the bottom of the settling zone while the oil phase, which is usually substantially free of salt, is removed from the top of the settling zone. The extent to which the oil is freed of salt is to a large degree a function of the size of the equipment and the amount of water employed. Usually, in order to secure a satisfactory lowering of the salt content of the oil it is necessary to employ relatively large size equipment.

Various electrical processes have also been suggested. In general, these processes comprise adding water to the salt-containing crude, heating the mixture to a temperature of about 200° F. at a pressure of about 75 pounds per square inch, and passing the stream through a pressure reducing valve or other mixing means to secure adequate mixing which results in emulsification. The emulsion is passed into a zone containing electrodes which maintain an electrical field between the same. Due to the effect of the electrical field, breaking of the emulsion results, which permits the aqueous phase to segregate from the oil phase. The salt to a large extent associates itself with the water phase.

In accordance with the present invention it is preferred to provide that the electrical desalting operation be conducted in a manner to pass a stream first through an electrical zone in which it is subjected to the effect of an electrical field and then passed through a separate and distinct settling zone. However, it will be understood that for certain types of operations the coalescing and settling zones may be combined and all of the brine removed by allowing it to flow off the surface of the electrodes in a manner to be described.

The present invention may be more readily understood by reference to the drawings illustrating the embodiments of the same, in which:

Figure I is a diagrammatic representation of a desalting process showing a vertical cross-section of a cylindrical desalting drum containing separate electrical treating and oil settling zones;

Figure II is a cross-sectional view taken on line A—A illustrating the configuration of the electrodes according to one embodiment of the present invention;

Figure III is a similar view showing a different electrode configuration; and

Figure IV is a similar view of still a third electrode configuration within the scope of the present invention.

Referring specifically to Figure I, a feed oil to be desalted is introduced into the system by means of line 10, heated to the desired temperature in heating zone 11, and mixed with caustic which is introduced by means of line 12. A demulsifier is added to the oil by means of line 13.

Under certain circumstances it may be preferable to add the demulsifier directly to the hot water stream. Hot water is added to the oil stream by means of line 14 and the entire mixture passed through a mixing zone 15. It is to be understood that the mixing zone may comprise a valve wherein the pressure is reduced in order to secure the desired turbulence and suitable mixing. The emulsion is withdrawn from zone 15 by means of line 16 and passed through the distributor nozzles 17 in order to distribute the emulsion between the electrodes 18, 19, 20, and 21. A suitable voltage potential, as for example, about 16,000 to 32,000 volts, is maintained between the positive and negative plates of the coalescing zone in order to secure breaking of the emulsion. Means for supplying such a potential are illustrated diagrammatically in Figures II, III, and IV. The treated emulsion is then withdrawn from the electrical treating zone and passed to the oil settling zone indicated by 22. Here it is separated into a light oil phase, which is withdrawn through line 23, and a relatively heavy brine phase, which is withdrawn through the brine outlet 24.

The present invention is most specifically concerned with the design of the electrodes 18, 19, 20, and 21, and with the action that takes place when the emulsion is passed between them. Figure II illustrates one preferred embodiment of the improved electrode design of the present invention.

The electrodes are located in the upper section of the cylindrical desalter 25, and in the embodiment shown in Figure II consist of a plurality of connected flat surfaces of metal, preferably steel, in the form of parallelograms, each electrode surface defining a plurality of faces of a prism. As illustrated by Figure I, the electrodes extend axially through the desalter drum parallel to the direction of flow of liquid. It is preferred that the longitudinal extent of the electrodes diminish progressively from the longest outer electrode nearest the surface of the drum to the shortest electrode nearest the center thereof. Such an arrangement permits coalesced brine to drop off the rear edge of the electrode without falling onto the electrode beneath it and thus avoiding undesired arcing. The outside electrode 18 is made up of six flat plates 26, 27, 28, 29, 30, and 31. The second electrode 19 consists likewise of six parallel plates 26', 27', 28', 29', 30', and 31', the primed numbered plates making up planes which are substantially parallel to the planes of the unprimed numbered plates. The two inner electrodes 20 and 21 are smaller, being made up of only four plates apiece, these being substantially parallel to one another also. The electrodes are spaced apart by the tie-rods 40 or equivalent means made of non-conducting material. These tie-rods do not extend along the entire length of the electrodes and so do not interfere with the flow of liquid. Conventional means, illustrated diagrammatically, are used to provide a potential difference between each pair of electrodes, and the emulsion is introduced in the center section within the area 32, which is delineated roughly by the dotted line. During the passage of the emulsion axially of the desalting drum 25 through the electrical treating zone, the potential difference between the surrounding electrodes causes the emulsion to break and effects the formation of discrete particles of brine. These particles settle under the influence of gravity to the surface of the electrodes, and, because the plates are inclined with respect to the horizontal, the coalesced brine tends to flow outwardly away from the central area 32 across the plates to the edges of the electrodes indicated at, for example, 33 and 34. Since the edges of each of the electrodes 18, 19, 20, and 21 all lie in the same horizontal plane, and since this plane is vertically below every other point on each of the electrodes, the coalesced brine tends to flow toward this plane, and there is no tendency for the brine collecting, for example, at edge 33 of electrode 19 to flow to edge 35 of plate 20. Instead, the brine flows downwardly into the bottom of the desalting drum 25. Thus it is impossible for brine to flow from one electrode to another and arcing cannot take place.

Figure III shows a different embodiment of the present invention in which the electrodes 18, 19, 20, and 21 are made of 180° segments of the sides of concentric cylinders having different diameters. Again the emulsion is introduced roughly within the area indicated by the dotted line and the coalesced brine tends to run outwardly off the edges of the electrodes, which again all lie in the same horizontal plane. Here again there is no tendency for the brine to flow from one electrode to another, and thus arcing is avoided. It will be understood, of course, that while 180° arcs of circles are illustrated, arcs subtending a different angle less than 180° as well as non-circular curved surfaces may be employed with equivalent effect.

Figure IV represents still another embodiment of the invention in which the electrodes are arranged as a series of parallel inverted V's. The operation of this embodiment is again the same as that of the embodiments employing the flat plates as in Figure II or the curved surfaces as in Figure III. The embodiments of Figure II and Figure IV are identical except for the number of plates used in making up the individual electrodes.

In operating a unit of the type described having a capacity of about 60,000 barrels of oil per day, it is found necessary to employ electrodes having a total surface area of about 150 square feet. It is preferable to make these electrodes of steel about 5/16 of an inch thick and to provide about 5 inches between electrodes.

Typical operating conditions for an electrical coalescing process of the type described are set forth in Table I below illustrating the results obtained from West Texas and Louisiana mixed crudes. Conditions of the process can be adjusted to provide an even smaller water carryover in the treated oil.

*Table I*

|  | West Texas | Louisiana Mixed |
|---|---|---|
| Feed Rate, Thousand Barrels per day | 48–50 | 48–50 |
| Mixer Pressure Drop, p. s. i. | 35 | 40 |
| Water Addition, Percent of Feed | 5 | 6 |
| Tretolite Demulsifier, Gallons Per Hour | 1 | 1 |
| Brine pH | 7–7.5 | 8–8.5 |
| Feed Salt, Pounds Per Thousand Barrels | 31 | 129 |
| Product Salt, Pounds Per Thousand Barrels | 8 | 21 |
| Feed Water, Percent | 0.2–0.4 | 0.4–0.5 |
| Product Water, Percent | 0.8–1.2 | 0.9–1.2 |

While there have been described a number of specific embodiments of the present invention, it is to be understood that equivalent means for carrying it out will occur to those skilled in the art, and that such equivalent means are intended to be within the scope of the invention as defined by the following claims.

What is claimed is:

1. Apparatus for the removal of salt from hydrocarbon mixtures comprising an elongated chamber, conduit means near one end of said chamber adapted to pass liquid to said chamber, a plurality of opposed, vertically spaced electrodes having edge portions and defining surfaces which are inclined with respect to the horizontal and which are substantially longitudinally coextensive with one another, said edge portions terminating in the same horizontal plane, said plane being vertically below all points on said surfaces, said electrodes extending axially through said vessel, parallel to the direction of flow of said liquid, said electrodes being positioned and housed completely within said chamber.

2. The apparatus of claim 1 in which said surfaces are substantially parallel to one another.

3. Apparatus according to claim 1 wherein said surfaces are defined by the sides of a plurality of coaxial prisms.

4. The apparatus of claim 1 in which the said surfaces are curved.

5. The apparatus of claim 4 wherein said curved surfaces are defined by 180° arcs of concentric cylinders.

6. Apparatus for the removal of salt from hydrocarbon mixtures by electrical coalescence comprising an elongated chamber, conduit means near one end of said chamber adapted to pass liquid to said chamber, a plurality of vertically spaced, opposed electrodes, substantially longitudinally coextensive with one another, each electrode defining a surface, each surface being inclined with respect to the horizontal and adapted to direct the flow of liquid onto a common, substantially horizontal plane, each edge portion of said electrodes terminating in the same horizontal plane, said plane being vertically below all points on said surfaces, said electrodes being positioned and housed completely within said chamber and extending axially through said vessel in the direction of flow of said liquid.

7. Apparatus according to claim 6 wherein the surfaces of said electrodes are defined by 180° arcs of concentric cylinders.

8. Apparatus according to claim 6 wherein the surfaces of said electrodes are defined by a plurality of connected plane surfaces, inclined with respect to one another.

9. Apparatus according to claim 6 wherein the surfaces of said electrodes are defined by inverted V's.

References Cited in the file of this patent

UNITED STATES PATENTS

| | | |
|---|---|---|
| 1,838,912 | Eddy | Dec. 29, 1931 |
| 1,838,927 | Fisher | Dec. 29, 1931 |
| 2,033,143 | McDonald | Mar. 10, 1936 |
| 2,320,059 | Bailey | May 25, 1943 |
| 2,479,302 | Bondley | Aug. 16, 1949 |

FOREIGN PATENTS

| | | |
|---|---|---|
| 515,020 | Belgium | Nov. 14, 1952 |